(12) United States Patent
Vyas et al.

(10) Patent No.: US 7,879,389 B2
(45) Date of Patent: Feb. 1, 2011

(54) LOW-COST BIPOLAR PLATE COATINGS FOR PEM FUEL CELL

(75) Inventors: Gayatri Vyas, Rochester Hills, MI (US); Upendra Rao, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 994 days.

(21) Appl. No.: 11/475,676

(22) Filed: Jun. 27, 2006

(65) Prior Publication Data

US 2007/0298309 A1 Dec. 27, 2007

(51) Int. Cl.
B05D 5/12 (2006.01)
B05D 3/00 (2006.01)
B05D 1/36 (2006.01)

(52) U.S. Cl. .............. 427/115; 427/189; 427/190; 427/201; 427/372.2

(58) Field of Classification Search .......... 427/115, 427/189–192, 201, 372.2
See application file for complete search history.

(56) References Cited

U.S. PATENT DOCUMENTS

| | | | |
|---|---|---|---|
| 4,175,165 A | 11/1979 | Adlhart | |
| 4,715,165 A * | 12/1987 | Thorogood | 53/469 |
| 5,942,347 A * | 8/1999 | Koncar et al. | 429/30 |
| 6,733,911 B2 | 5/2004 | Kawahara | |
| 6,746,982 B2 * | 6/2004 | Hertel et al. | 502/180 |
| 2005/0008919 A1 | 1/2005 | Extrand | |
| 2005/0058827 A1 | 3/2005 | Arning et al. | |
| 2006/0194095 A1 * | 8/2006 | Vyas et al. | 429/38 |
| 2006/0216571 A1 * | 9/2006 | Vyas et al. | 429/38 |
| 2007/0003813 A1 * | 1/2007 | Vyas et al. | 429/38 |
| 2007/0003815 A1 * | 1/2007 | Vyas et al. | 429/38 |

FOREIGN PATENT DOCUMENTS

| | | | |
|---|---|---|---|
| CN | 1421946 A | | 6/2003 |
| DE | 102 59 383 A1 | | 7/2004 |
| WO | WO 2006/055146 | * | 5/2006 |
| WO | WO 2006/055146 A2 | | 5/2006 |

OTHER PUBLICATIONS

G. Shustak, A. Domb and D. Mandler, "Preparation and Characterization of n-Alkanoic Acid Self-Assembled Monolayers Adsorbed on 316L Stainless Steel", 2004 American Chemical Society, Langmuir 2004, 20, 7499-7506. Publ. on Web Jul. 29, 2004.

R. Shacham, D. Avnir and D. Mandler, "Simultaneous Electrodeposition of Cu and TiO2 Forming Hybrid Sol-Gel Thin Films", Institute of Chemistry, The Hebrew University of Jerusalem, Chem.Commun., 2002, 1-XX, 1-3.

* cited by examiner

*Primary Examiner*—Brian K Talbot
(74) *Attorney, Agent, or Firm*—John A. Miller; Miller IP Group, PLC

(57) ABSTRACT

A method for depositing a hydrophilic and electrically conductive layer onto a bipolar plate substrate for a fuel cell in a one step process. The method includes mixing a solution of a conductive material, such as gold particles, and a hydrophilic material, such as silicon dioxide particles, in a suitable solvent, such as ethanol. The solution is then deposited on the bipolar plate substrate by any suitable low cost process. Once the solution dries and the ethanol has evaporated, a thin layer of the conductive and hydrophilic particles remains on the substrate. In one embodiment, the conductive particles are significantly larger than the hydrophilic particles to provide both the desirable hydrophilicity and the low contact resistance.

17 Claims, 2 Drawing Sheets

LOW-COST BIPOLAR PLATE COATINGS FOR PEM FUEL CELL

BACKGROUND OF THE INVENTION

1. Field of the Invention

This invention relates generally to bipolar plates for fuel cells and, more particularly, to a method for depositing a hydrophilic and electrically conductive layer on a bipolar plate for a fuel cell that is a low-cost one step process.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water accumulates within the flow channels because the flow rate of the reactant gas is too low to force the water out of the channels. As the water accumulates, it forms droplets that continue to expand because of the relatively hydrophobic nature of the plate material. The contact angle of the water droplets is generally about 80°-90° that the droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed in the art to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $\beta+\alpha/2<90°$, where $\beta$ is the static contact angle and $\alpha$ is the channel corner angle. For a rectangular channel $\alpha/2=45°$, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

Various processes have been proposed in the art to deposit hydrophilic and electrically conductive materials onto a bipolar plate. Typically, these processes are two step processes and are expensive. For example, one process includes first depositing a gold layer onto a stainless steel bipolar plate by a physical vapor deposition (PVD) process, and then depositing a silicon dioxide ($SiO_2$) layer on the gold layer by a plasma enhanced chemical vapor deposition (CVD) process. Other processes include co-sputtering gold and silicon dioxide onto the bipolar plate substrate. However, all of these processes are fairly cost prohibitive.

It has also been proposed in the art to deposit a colloidal dispersion of silicon dioxide nano-particles in ethanol onto a bipolar plate substrate using low cost coating methods, such as spraying or dipping. One such commercially available material including $SiO_2$ nano-particles dispersed in ethanol is x-tec HP4014/3408 provided by Nano-X Gmbh of Saarbrucken, Germany. When this material is applied to the bipolar plate substrate and cured, it produces a hydrophilic coating on metals, ceramics or plastics.

SUMMARY OF THE INVENTION

In accordance with the teachings of the present invention, a method for depositing a hydrophilic and electrically conductive layer onto a bipolar plate substrate for a fuel cell in a one step process is disclosed. The method includes preparing the bipolar plate substrate by removing the oxide film that may have formed on the substrate. The method also includes mixing a solution of a conductive material, such as gold particles, and a hydrophilic material, such as silicon dioxide particles, in a suitable solvent, such as ethanol. The solution is then deposited on the bipolar plate substrate by any suitable low cost process, such as dipping the substrate in the solution or spraying the solution onto the substrate. Once the solution dries and the ethanol has evaporated, a thin layer of the conductive and hydrophilic particles remains on the substrate. In one embodiment, the conductive particles are significantly larger than the hydrophilic particles to provide both the desirable hydrophilicity and the low contact resistance.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for depositing a hydrophilic and electrically conductive coating onto a bipolar plate for a fuel cell is merely exemplary in nature, and is in no way intended to limit the invention or its applications or uses.

Figure 1:
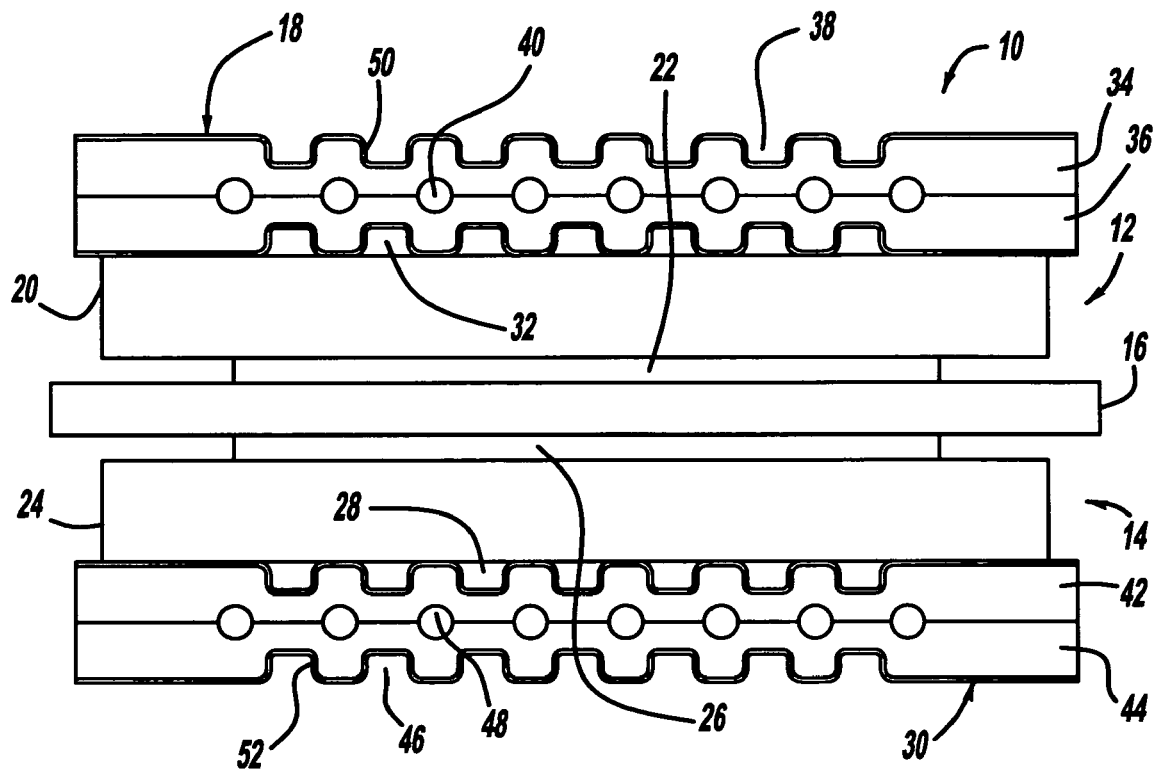
FIG. 1 is a cross-sectional view of a fuel cell in a fuel cell stack that includes a bipolar plate having a hydrophilic and electrically conductive layer.

FIG. 1 is a cross-sectional view of a fuel cell 10 that is part of a fuel stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The end product is water, which does not have any negative impact on the environment.

In this non-limiting embodiment, the bipolar plate 18 includes two sheets 34 and 36 that are stamped and formed together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. The bipolar plates 18 and 30 can be made of any suitable material that can be stamped, such as stainless steel, titanium, aluminum, etc.

The bipolar plate 18 and 30 include outer layers 50 and 52, respectively, that make the plates 18 and 30 conductive, corrosion resistant, hydrophilic and stable in the fuel cell environment. Any combination of suitable hydrophilic and electrically conductive materials can be used in the layers 50 and 52, such as metal oxides and conductive metals. Suitable metal oxides for the layers 50 and 52 include, but are not limited to, titanium dioxide ($TiO_2$), hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. Suitable conductive metals include gold and noble metals, such as iridium (Ir), platinum (Pt), ruthenium (Ru), rhodium (Rh), palladium (Pd) and osmium (Os). Additionally, doped metal oxides can be used that exhibit both hydrophilicity and electrical conductivity. Suitable dopants can be selected from materials that can create suitable point defects, such as N, C, Li, Ba, Pb, Mo, Ag, Au, Ru, Re, Nd, Y, Mn, V, Cr, Sb, Ni, W, Zr, Hf, etc. and mixtures thereof. In one particular embodiment, the doped metal oxide is niobium (Nb) and tantalum (Ta) doped titanium oxide ($TiO_2$), and fluorine (F) doped antimony (Sb) doped and indium (In) doped tin oxide ($SnO_2$).

The amount of dopant in the layers 50 and 52 can be in the range of 0-10% of the composition of the layers 50 and 52 in one embodiment. Other suitable materials include zirconium oxide, mixed metal oxide such as $TiZrO_3$, and colloidal alumina.

Figure 2:
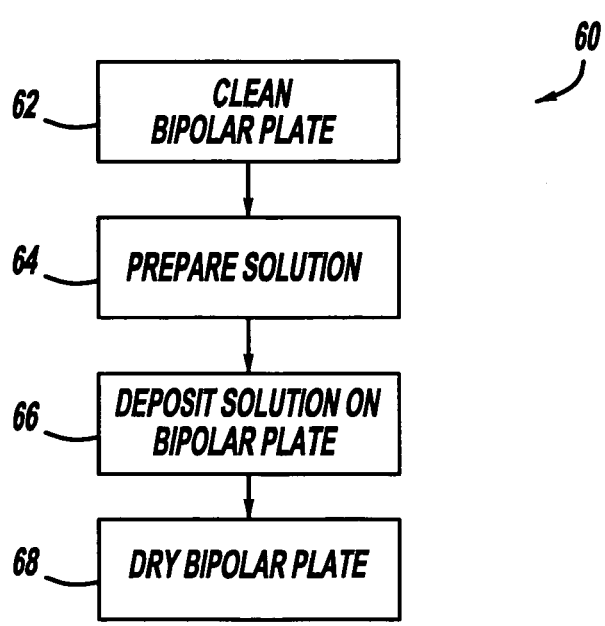
FIG. 2 is a flow chart diagram showing a process for depositing a hydrophilic and electrically conductive coating on a bipolar plate, according to an embodiment of the present invention.

According to the invention, the layers 50 and 52 are deposited on the bipolar plates 18 and 30 by a single step low cost process. FIG. 2 is a flow chart diagram 60 showing a process for depositing the layers 50 and 52 on the bipolar plates 18 and 30. At box 62, the bipolar plate is cleaned by a suitable process, such as ion beam sputtering, to remove the resistive oxide film on the outside of the plate that may have formed. A solution is prepared at box 64 that is a colloidal suspension prepared by Sol-gel techniques that includes particles of a conductive material and a hydrophilic material dispersed in a suitable solvent, such as ethanol. In one embodiment, the conductive particles are gold particles and the hydrophilic material can be silicon dioxide. The silicon dioxide material can be a colloidal suspension of silicon dioxide nano-particles in a suitable solution, such as ethanol, prepared by Sol-gel techniques. A colloidal dispersion of silicon dioxide particles in ethanol is available from Nano-X, and can be further diluted in ethanol, such as up to 10 times. Further, gold particles can also be dispersed in ethanol to more effectively mix with the silicon dioxide nano-particles in the colloidal dispersion. For example, gold can be bought as a paste including the gold particles, and can be dissolved in the ethanol.

The solution is then deposited on the bipolar plate at box 66 by any suitable process. Suitable examples include dipping the bipolar plate in the solution or spraying the solution onto the bipolar plate. The bipolar plate is then allowed to dry or cure at box 68 so as to form a dense hydrophilic and electrically conductive film on the bipolar plate suitable for the fuel cell environment in a low cost process. The drying process can be performed using heat or by air-drying.

Various experiments have been conducted to determine the proper amount of the electrically conductive material and the hydrophilic material, and the proper size of the various particles. It has been discovered through these various experiments that larger size gold particles relative to the silicon dioxide particles provides the best low contact resistance while maintaining the desirable hydrophilicity. In one embodiment, the silicon dioxide nano-particles were in the 20-50 nm range and the gold particles were in the micron range. By providing larger size gold particles, and a thin film, less gold is necessary to achieve the desired low contact resistance.

Figure 3:
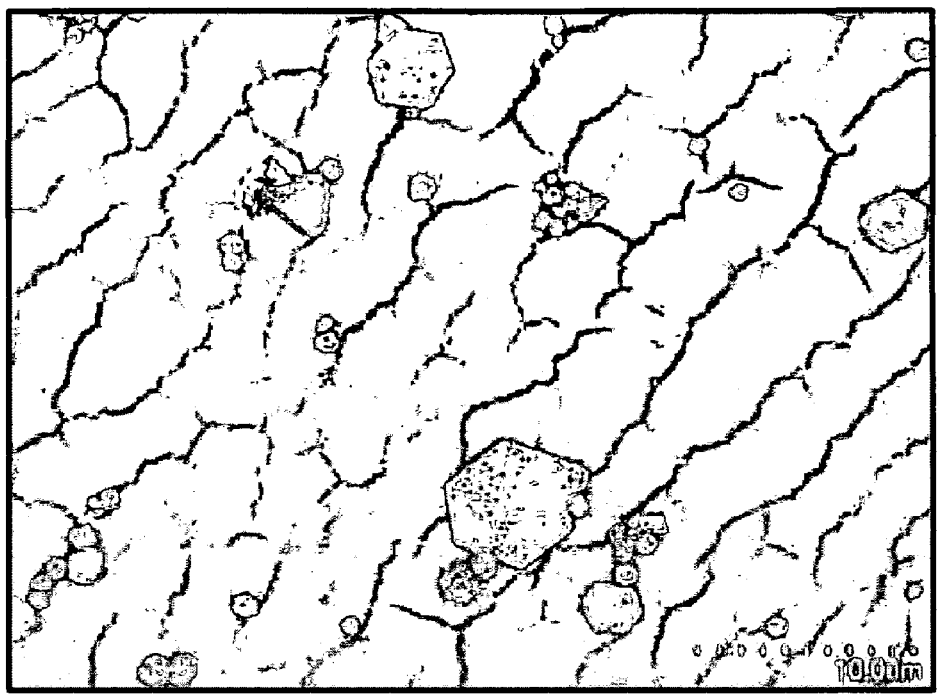
FIGS. 3 and 4 are micrographs of a hydrophilic and electrically conductive coating deposited by the process of the invention on a substrate.
Figure 4:
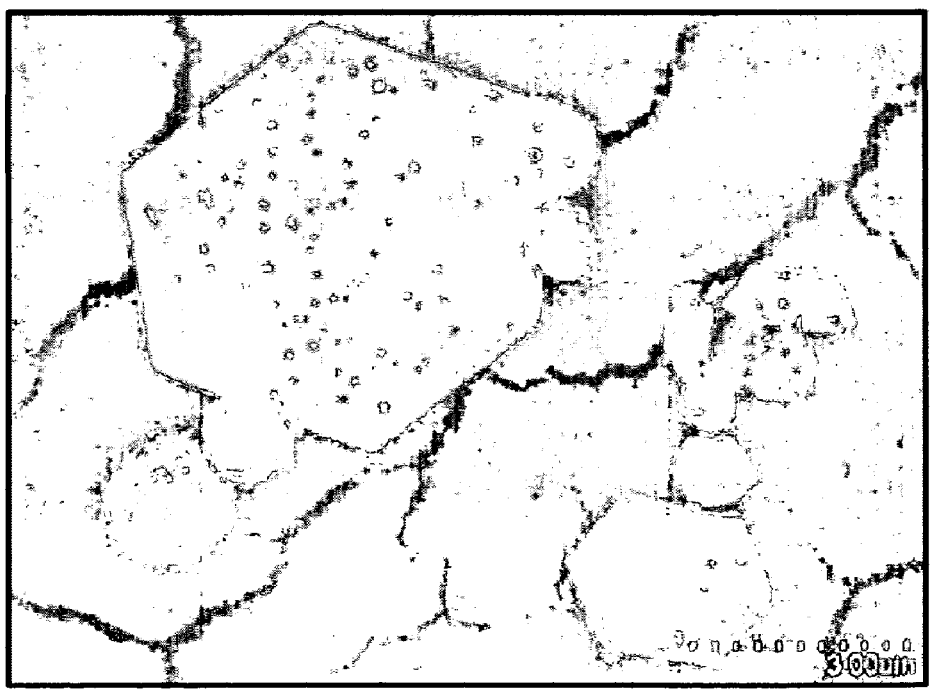

To illustrate this, FIGS. 3 and 4 are micrographs of a layer on a stainless steel substrate providing the desired properties for the fuel cell environment, where the darker region is a dense film of the silicon dioxide nano-particles adhere together on the substrate, and the larger lighter regions are gold particles that extend completely through the layer. The magnification of the FIG. 3 micrograph is 10,000× and the magnification of the FIG. 4 micrograph is 3000×. In one embodiment, the thickness of the layer is in the 100-200 nm range.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for depositing an electrically conductive and hydrophilic layer onto a bipolar plate substrate for a fuel cell, said method comprising:
   providing a solution including electrically conductive particles dispersed in a solvent;
   providing a solution including hydrophilic particles dispersed in a solvent;
   mixing the solution of the electrically conductive particles with the solution of the hydrophilic particles;
   depositing the mixed solution onto the bipolar plate substrate; and
   drying the solution to evaporate the solvent and provide a film of the electrically conductive and hydrophilic particles.

2. The method according to claim 1 wherein providing a solution of electrically conductive particles includes providing a solution of gold particles dispersed in an alcohol solvent.

3. The method according to claim 1 wherein providing a solution of hydrophilic particles includes providing a solution of silicon dioxide particles dispersed in an alcohol solvent.

4. The method according to claim 1 wherein the electrically conductive particles are larger in size than the hydrophilic particles.

5. The method according to claim 4 wherein the electrically conductive particles have a diameter in the micron range and the hydrophilic particles have a diameter in the 20-50 nm range.

6. The method according to claim 1 wherein the dried film has a thickness in the range of 100-200 nm.

7. The method according to claim 1 wherein the bipolar plate substrate is a stainless steel substrate.

8. The method according to claim 1 wherein providing a solution of hydrophilic particles includes providing a solution of hydrophilic particles selected from the group consisting of titanium dioxide, hafnium dioxide, zirconium dioxide, aluminum oxide, tin oxide, tantalum pent-oxide, niobium pent-oxide, molybdenum dioxide, iridium dioxide, ruthenium dioxide and mixtures thereof.

9. The method according to claim 1 wherein providing a solution of hydrophilic particles and providing a solution of electrically conductive particles includes providing a solution selected from the group consisting of fluorine doped tin oxide, antimony doped tin oxide, indium doped tin oxide, tantalum doped titanium oxide and niobium doped titanium oxide.

10. The method according to claim 1 wherein providing the solutions, mixing the solutions and drying the mixed solution includes using Sol-gel techniques.

11. The method according to claim 1 wherein providing a solution including electrically conductive particles dispersed in a solvent includes providing a solution of electrically conductive particles selected from the group consisting of iridium, platinum, ruthenium, rhodium, palladium and osmium.

12. A method for depositing an electrically conductive and hydrophilic layer onto a bipolar substrate for a fuel cell, said method comprising:
   providing a solution including gold particles dispersed in an alcohol solvent;
   providing a solution including silicon dioxide particles dispersed in an alcohol solvent;
   mixing the solution of the gold particles with the solution of the silicon dioxide particles;
   depositing the mixed solution onto the bipolar substrate; and drying the solution to evaporate the solvent and provide a film of the gold particles and the silicon dioxide particles.

13. The method according to claim 12 wherein providing the solutions, mixing the solutions and drying the mixed solution includes using Sol-gel techniques.

14. The method according to claim 12 wherein the gold particles are larger in size than the silicon dioxide particles.

15. The method according to claim 14 wherein the gold particles have a diameter in the micron range and the silicon dioxide particles have a diameter in the 20-50 nm range.

16. The method according to claim 12 wherein the dried film has a thickness in the range of 100-200 nm.

17. The method according to claim 12 wherein the bipolar plate substrate is a stainless steel substrate.

* * * * *